(12) United States Patent
Hsu et al.

(10) Patent No.: US 9,348,702 B2
(45) Date of Patent: *May 24, 2016

(54) SYSTEM AND METHOD FOR INCREMENTAL VIRTUAL MACHINE BACKUP USING STORAGE SYSTEM FUNCTIONALITY

(71) Applicant: EMC Corporation, Hopkinton, MA (US)

(72) Inventors: Windsor W. Hsu, San Jose, CA (US); Jian Xing, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,033

(22) Filed: Jul. 10, 2015

(65) Prior Publication Data

US 2015/0317209 A1 Nov. 5, 2015

Related U.S. Application Data

(63) Continuation of application No. 13/631,794, filed on Sep. 28, 2012, now Pat. No. 9,104,331.

(51) Int. Cl.
*G06F 12/12* (2006.01)
*G06F 11/14* (2006.01)
(Continued)

(52) U.S. Cl.
CPC ............ *G06F 11/1448* (2013.01); *G06F 3/065* (2013.01); *G06F 9/45558* (2013.01); *G06F 11/1438* (2013.01); *G06F 11/1451* (2013.01); *G06F 11/1479* (2013.01); *G06F 17/30091* (2013.01); *G06F 17/30233* (2013.01); *H04L 67/10* (2013.01); *G06F 12/08* (2013.01); *G06F 12/12* (2013.01); *G06F 12/121* (2013.01); *G06F 2009/45583* (2013.01); *G06F 2201/815* (2013.01); *G06F 2201/84* (2013.01)

(58) Field of Classification Search
CPC ......... G06F 3/065; G06F 12/08; G06F 12/12; G06F 12/121
USPC ............ 711/156, 161, 165, 206, 209; 710/28, 710/308; 709/212, 232; 707/633, 638, 639, 707/646, 659, 667
See application file for complete search history.

(56) References Cited

U.S. PATENT DOCUMENTS 7,155,465 B2 12/2006 Lee et al.
7,650,341 B1 1/2010 Oratovsky et al.
(Continued)

OTHER PUBLICATIONS

Non-Final Office Action, U.S. Appl. No. 13/436,454, dated May 3, 2013, 12 pages.
(Continued)

*Primary Examiner* — Reba I Elmore
(74) *Attorney, Agent, or Firm* — Blakely, Sokoloff, Taylor & Zafman LLP (57) ABSTRACT

Techniques for virtual machine incremental backup are described herein. According to one embodiment, a request for an incremental backing up a virtual machine (VM) is received at a storage system, the request identifying a requested VM disk image associated with a consistent state of the VM. The storage system determines a difference between the requested VM disk image and a previous VM disk image representing a previous VM backup. The changes between the requested VM disk image and a previous VM disk image are then transmitted to a target backup storage system.

24 Claims, 10 Drawing Sheets

(51) Int. Cl.
*G06F 3/06* (2006.01)
*G06F 9/455* (2006.01)
*H04L 29/08* (2006.01)
*G06F 17/30* (2006.01)
*G06F 12/08* (2016.01)

(56) References Cited

U.S. PATENT DOCUMENTS

| | | |
|---|---|---|
| 8,010,495 B1 | 8/2011 | Kuznetzov et al. |
| 8,046,550 B2 | 10/2011 | Feathergill |
| 8,326,803 B1 | 12/2012 | Stringham |
| 8,347,388 B1 | 1/2013 | Dutch et al. |
| 8,719,286 B1 * | 5/2014 | Xing ............ G06F 11/1451 707/755 |
| 8,751,515 B1 * | 6/2014 | Xing ............ G06F 17/30073 707/755 |
| 9,104,331 B2 * | 8/2015 | Hsu ............ G06F 11/1438 |
| 2007/0244938 A1 | 10/2007 | Michael et al. |
| 2009/0007106 A1 | 1/2009 | Araujo, Jr. et al. |
| 2010/0011178 A1 | 1/2010 | Feathergill |
| 2010/0049929 A1 * | 2/2010 | Nagarkar ............ G06F 9/45533 711/162 |
| 2010/0049930 A1 | 2/2010 | Pershin et al. |
| 2010/0138827 A1 | 6/2010 | Frank et al. |
| 2011/0010515 A1 | 1/2011 | Ranade |
| 2012/0158806 A1 | 6/2012 | Snyder et al. |
| 2012/0233123 A1 | 9/2012 | Shisheng et al. |
| 2012/0233282 A1 | 9/2012 | Voccio et al. |
| 2012/0233611 A1 | 9/2012 | Voccio |
| 2012/0323853 A1 | 12/2012 | Fries et al. |
| 2012/0324183 A1 | 12/2012 | Chiruvolu et al. |
| 2013/0054529 A1 | 2/2013 | Wang et al. |
| 2013/0219161 A1 | 8/2013 | Fontignie et al. |
| 2013/0262801 A1 | 10/2013 | Sancheti et al. |

OTHER PUBLICATIONS

Non-Final Office Action, U.S. Appl. No. 13/436,460, dated May 7, 2013, 12 pages.
Final Office Action, U.S. Appl. No. 13/436,460, dated Aug. 5, 2013, 14 pages.
Final Office Action, U.S. Appl. No. 13/436,454, dated Aug. 9, 2013, 13 pages.
Notice of Allowance, U.S. Appl. No. 13/436,454, dated Jan. 6, 2014, 9 pages.
International Search Report and Written Opinion, Application No. PCT/US2013/061478, dated Jan. 2, 2014, 11 pages.
Notice of Allowance, U.S. Appl. No. 13/436,460, dated Feb. 14, 2014, 8 pages.
Non-Final Office Action, U.S. Appl. No. 13/631,794, dated Jun. 10, 2014, 12 pages.
Final Office Action, U.S. Appl. No. 13/631,794, dated Dec. 10, 2014, 9 pages.
Non-Final Office Action, U.S. Appl. No. 13/631,774, dated Dec. 17, 2014, 14 pages.
Notice of Allowance, U.S. Appl. No. 13/631,794, dated Apr. 3, 2015, 7 pages.
Notice of Allowance, U.S. Appl. No. 13/631,774, dated May 4, 2015, 7 pages.

* cited by examiner

SYSTEM AND METHOD FOR INCREMENTAL VIRTUAL MACHINE BACKUP USING STORAGE SYSTEM FUNCTIONALITY

CROSS-REFERENCE TO RELATED APPLICATIONS

This application is a continuation of U.S. patent application Ser. No. 13/631,794, filed Sep. 28, 2012, which is related to U.S. patent application Ser. No. 13/436,454, filed Mar. 30, 2012, now U.S. Pat. No. 8,719,286, issued May 6, 2014, U.S. patent application Ser. No. 13/436,460, filed Mar. 30, 2012, now U.S. Pat. No. 8,751,515, issued Jun. 10, 2014, and co-pending U.S. patent application Ser. No. 13/631,774, filed Sep. 28, 2012. The disclosure of the above applications is incorporated by reference herein in its entirety.

FIELD OF THE INVENTION

Embodiments of the present invention relate generally to data storage systems. More particularly, embodiments of the invention relate to virtual machine (VM) backup.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). This results in higher server utilization but also means that there are fewer server resources available to perform backup and/or restore. The problem is compounded by the unabated growth in data and applications, which makes it ever more difficult to complete backup and/or restore within the available time window.

One approach to backup and restore in a VM environment is to handle each VM as though it is a physical machine. This typically means installing and running a backup agent in each VM. This approach is server resource intensive and becomes unwieldy from a management perspective as the number of virtual machines increases.

Another approach is to back up a VM at the storage level by making a copy of the storage containers that contain the VM. Identifying exactly the storage containers that contain the VM and getting them to be in a consistent state are, however, challenging.

Another approach is to back up at the VM level. Virtualization vendors such as VMware provide a set of application programming interface (API) for a backup application. One may use a VM API such as VMware's vStorage APIs for Data Protection (VADP) to pull the data out of the virtual infrastructure and onto a backup system. This typically requires routing the data through a proxy server and consumes precious IT resources.

On incremental backup, a backup software may walk the file system and find which of the files that has been changed. However, walking the file system is slow and resource intensive. Another conventional method of incremental backup uses a changed block traning (CBT) feature provided by a virtual machine monitor or manager to keep track of data blocks changed since last backup. The CBT feature, however, imposes an overhead on the operation of the VM, and may no track changes across unexpected system shutdowns. Furthermore, not all virtualization vendors provide the feature of CBT, which limit the effective usage of this approach.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiment, a client has one or more virtual machine monitor or manager (VMM), and each hosts one or more VM. In this specification, the terms "VM monitor" and "VM manager" are used interchangeably. The client has a storage system associated with it to store data, and the client also contains a VM application programming interface (VM API) via which the VMs are managed. An example of VM API is VMware's vStorage APIs for Data Protection (VADP). A request for backing up a VM is sent from a backup application server to the client. Through the VM API, the VMM hosting the VM establishes a consistent state of the VM. In one embodiment, this involves taking a snapshot of the VM which causes the VM to be quiesced and snapshots of the disks associated with the VM to be taken. The backup application server then identifies the disk snapshots via the VM API. After the disk snapshots are identified, the backup application server notifies the storage system containing the identified disk snapshots to copy the snapshots to a target backup storage system. The storage system then copies the identified disk snapshots to the target backup storage system. Finally, the backup application server uses VM API to ask VMM to delete the VM snapshot taken, which causes the corresponding disk snapshots to be deleted.

According to another embodiment, a virtual center (VC) manages multiple clients. Each client contains one or more VMs, and each client has access to a storage system. The storage system stores content files of VMs in disks of the storage system. In one embodiment, the VC stores a list of attributes associated with VMs and the list of attributes are stored as VM configuration information files. A backup application server may send backup request to back up a VM to the VC. The VC then remotely (e.g., over a network such as the Internet) requests a VMM hosting the VM to establish a consistent state of the VM. Afterward, the backup process is similar to the embodiment where the request is sent to VMM directly.

In one embodiment, the copied disk snapshots are parsed in the target backup storage system. Metadata in the disk snapshots are interpreted to determine information about the files contained in the disk snapshots. Such information includes file attributes such as file name, access control information, and information about layout of the file within the disk snapshots. Such information is then used to populate a backup catalog of the files in the backed up VM. The copied disk snapshots may further be deduplicated and stored in the backup storage system as deduplicated segments.

According to some embodiments, a VM can be restored from a target backup storage system. The backup application server identifies the disk snapshots associated with a backup of the VM through the backup catalog. In one embodiment, the backup application server then remotely requests a VMM to provision a new VM to be the target of the restoration via a VM API. In one embodiment, provisioning a new VM to be the target of the restoration includes identifying the list of the attributes associated with the backup of the VM and provisioning the new VM using the identified list of the attributes. After new VM is provisioned, the backup application server sends the identified disk snapshots from the target backup storage system to the storage system via a VM API. The copied disk snapshots are added to the newly provisioned VM via the VM API. The VM is then restored.

According to some embodiment, a user may also utilize a backup application server for incremental backup of a VM. In one embodiment, a request for incrementally backing up a VM is sent from a backup application server to a VMM of a client hosting the VM. The backup application server then remotely takes a snapshot of the VM through a VM API. This includes quiescing the VM and taking a VM snapshot, which causes disk snapshots associated with the VM to be taken. The backup application server notifies the storage system containing the identified disk snapshots to copy the identified disk snapshots to a target backup storage system. The storage system then identifies the changes that have occurred since a last backup, for example, by comparing the disk snapshots of the VM with disk snapshots associated with a previous backup of the same VM. In one embodiment, the storage system sends only the changes between the snapshots to the backup storage system, without having to transmit the entire disk snapshots.

Figure 1:
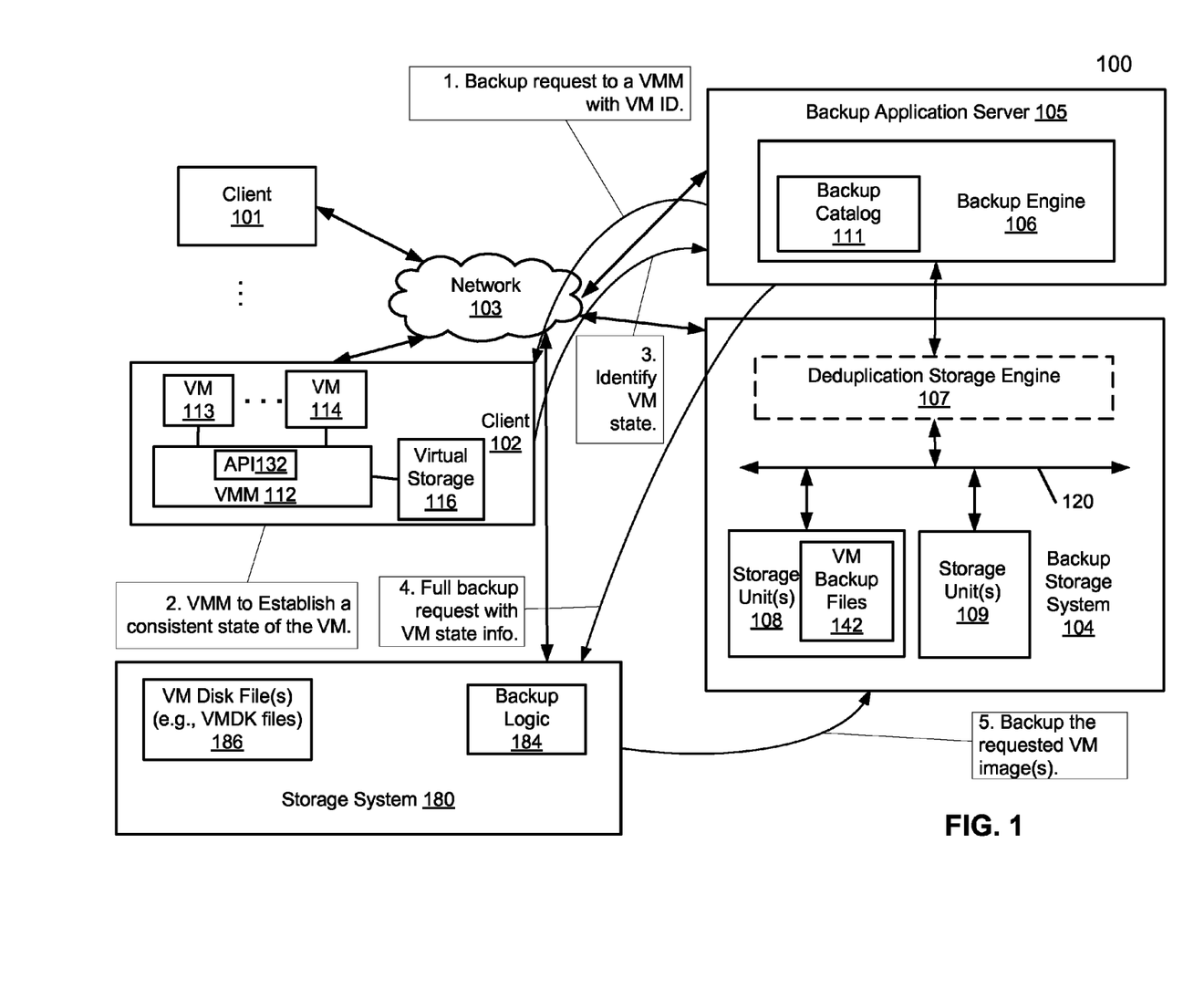
FIG. 1 is a block diagram illustrating a full backup process according to one embodiment of the invention.

FIG. 1 is a block diagram illustrating a backup process according to one embodiment of the invention. Referring to FIG. 1, system 100 includes, but is not limited to, one or more client systems 101-102 communicatively coupled to backup storage system 104, backup application server 105 and storage system 180 over network 103. Clients 101-102 may be any type of clients such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Backup storage system 104 may include any type of server or cluster of servers. For example, backup storage system 104 may be a storage server used for any of various different purposes, such as to provide multiple users with access to shared data and/or to back up mission critical data. Backup storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Backup storage system 104 may have a distributed architecture, or all of its components may be integrated into a single unit. Backup storage system 104 may be implemented as part of an archive and/or backup storage system such as a de-duplication storage system available from EMC® Corporation of Hopkinton, Mass.

In one embodiment, backup application server 105 includes, but not limited to, a backup engine 106, which contains a backup catalog 111. Backup application server 105 coordinates with backup storage system 104, storage system 180, and clients 101-102 to run various backup operations. Backup engine 106 may perform both backup and restore functions.

In one embodiment, backup storage system 104 includes, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Note that in one embodiment, backup application server 105 and backup storage system 104 are integrated into one single system.

In response to a data file to be stored in storage units 108-109, optional deduplication storage engine 107 is configured to segment the data file into multiple segments according to a variety of segmentation policies or rules. Deduplication storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup data from client systems 101-102 and to store the backed up data in one or more of storage units 108 of backup storage system 104, where the data may be deduplicated by deduplication storage engine 107. In this example, a user (e.g., an administrator) initiates a backup request, directly or through a backup schedule, of a VM, such as VM 113 within client 102. The user issues the request with the identification of the VM, VM113.

As shown in FIG. 1, the to-be-backed-up VM113 resides at client 102. Client 102 includes one or more VMs 113-114 hosted by VMM 112. VMM 112 also includes an application programming interface (API) 132, through which VMM 112 manages VMs 113-114. In one embodiment, the API is a VM API such as VMware's vStorage APIs for Data Protection (VADP). In addition, client 102 is communicatively coupled with storage system 180.

Storage system 180 may include any type of server or cluster of servers. For example, storage system 180 may be a storage server used for any of various different purposes, such as to provide multiple users with access to shared data and/or to back up mission critical data. Storage system 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 180 may have a distributed architecture, or all of its components may be integrated into a single unit. Storage system 180 may be implemented as part of a storage system available from EMC® Corporation of Hopkinton, Mass.

Storage system 180 contains backup logic 184 that manages both backup and restore processes within the storage system. Storage system 180 also contains VM disk files 186 that are the content files of the VMs. Note that a storage system of a client may also be called the primary storage of the client to distinguish the storage from backup storage systems.

A virtual machine represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources. Here VMM 112 manages both VM 113 and VM 114.

Referring back to FIG. 1, task boxes 1 to 5 illustrate the order in which operations are performed according to one embodiment of the invention. The process is initiated with a request to back up a VM. The request may come from a client based on a backup schedule, or it may come from a user directly through a user interface. At task box 1, backup engine 106 sends out a request to backup with a VM identifier (indicating VM 113 in this example) to VMM 112, which hosts the to-be-backed-up VM 113. Backup engine 106 directs the request to VMM 112 as backup application server 105 knows VM location information. Backup application server 105 may obtain VM information through various ways. For example, backup application server 105 may synchronize with VMM 112 remotely. Onward to task box 2, VMM 112 then establishes a consistent state of VM113. In one embodiment, VMM 112 establishes the consistent state of VM113 by taking a VM snapshot. The VM snapshot triggers the creation of one or more snapshots of the content files associated with the VM (e.g. VM disk images) in and/or by storage system 180. Such snapshots are referred to as disk snapshots in this specification. In task box 3, via API 132, backup engine 106 remotely identifies the consistent state of VM 113, which includes a list of the disk snapshots created in storage system 180 in one embodiment. Backup engine 106 then requests storage system 180 to send VM disk images associated with the consistent state of the VM to a target backup storage at task box 4. In one embodiment, the VM disk images are disk snapshots resulting from VM snapshot initiated by VMM 112. Finally at task box 5, backup logic 184 then identifies the requested VM disk images. In this example, they are represented by VM disk file 186. VM disk file 186 may take a format of a virtual machine disk (VMDK) provided by VMware. Backup logic 184 copies VM disk file 186 associated with VM113 to backup storage system 104. In one embodiment, the disk snapshots for VM 113 are parsed and metadata in the disk snapshots are interpreted to determine information about the files contained in the disk snapshots. Such information includes file attributes such as file name, access control information, and information about layout of the files within the disk snapshot. The information is then used to populate a backup catalog 111 of the files in the VM that was backed up. The disk snapshots are then saved as VM backup files 142 in storage unit 108. According to one embodiment, the backup content may be further deduplicated into deduplicated segments and the deduplicated segments are then stored in one or more physical disks of the backup storage system. In one embodiment, backup storage system 104 remotely requests VMM 112 to delete the VM snapshot taken of VM 113, which causes the corresponding disk snapshots of VM 113 to be deleted. Note that in one embodiment, the target backup storage system may be proxy server. In one embodiment, a proxy server is utilized when storage system 180 and backup storage system 104 are not compatible.

In one embodiment, storage system 180 divides the disk snapshots into segments and copies only the segments that do not already exist in backup storage system 104 when backup storage system 104 is a deduplicating storage system. In one embodiment, the segments are variable sized and the segment boundaries are defined by the content of the data. Such segments (also referred to as chunks) may be segmented within storage system 180 using a predetermined chunking algorithm. For each of the segments, a fingerprint is generated using a predetermined hash function. Storage system 180 may initially transmit fingerprints of the segments to backup storage system 104 without transmitting the actual segments. Based on the fingerprints received from storage system 180, deduplication storage engine 107 may determine which of the segments have already been stored in storage units 108-109, for example, by comparing the fingerprints received from storage system 180 and those maintained locally within backup storage system 104. For those segments that have not been stored in storage units 108-109, backup storage system 104 transmits identifying information of the missing segments to storage system 180, such as the fingerprints of the missing segments. In response, storage system 180 identifies the missing segments based on the identifying information received from backup storage system 104 and only transmits the missing segments over to backup storage system 104.

In one embodiment, via API 132, backup engine 106 collects attributes associated with the VM being backed up (e.g. CPU, memory, disk configuration) and stores the VM attributes in backup catalog 111. The attributes are subsequently used to provision a new VM to be the target of restoration.

Figure 2:
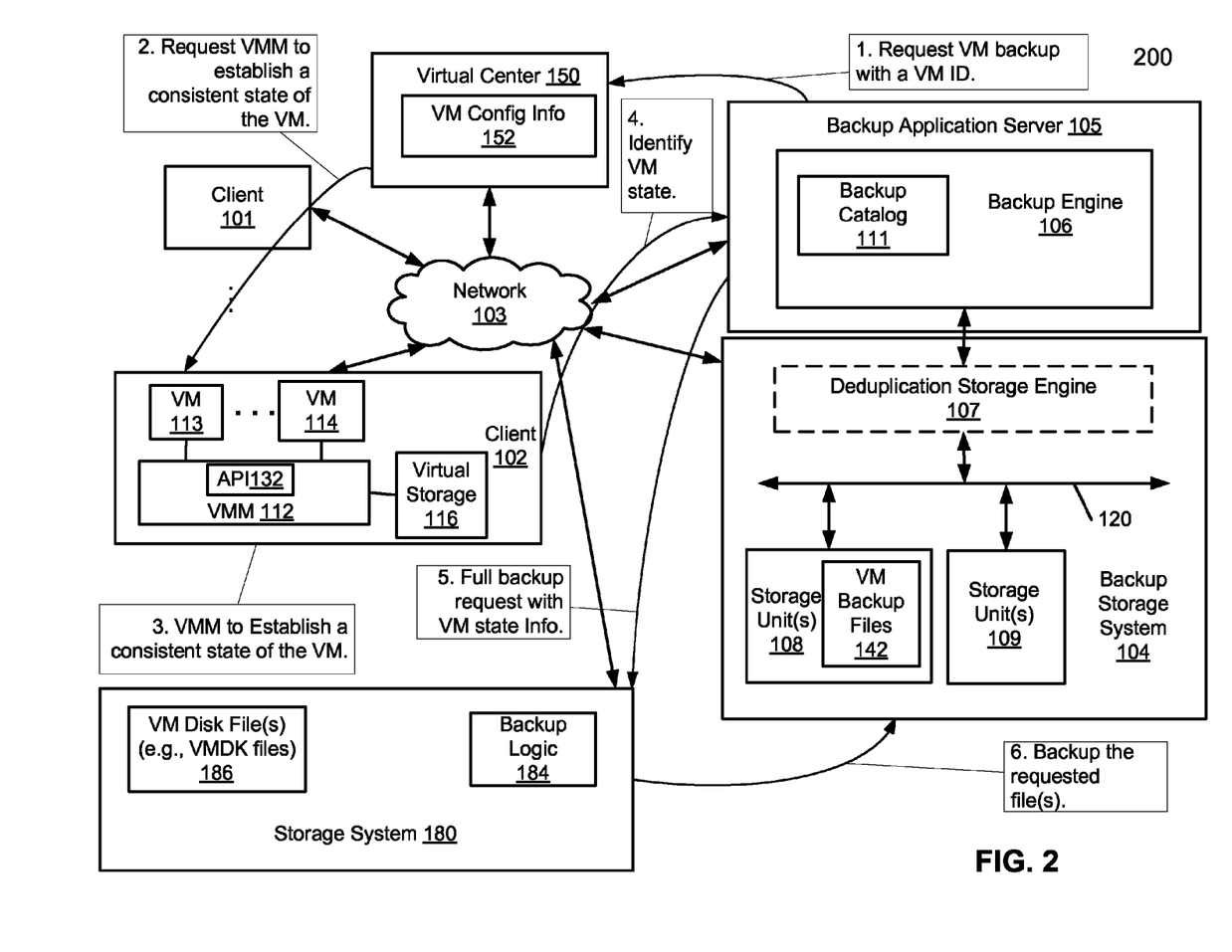
FIG. 2 is another block diagram illustrating a full backup process according to one embodiment of the invention.

FIG. 2 is another block diagram illustrating a full backup process according to one embodiment of the invention. The systems in FIG. 2 are similar to the systems in FIG. 1 and the same or similar references indicate elements or components having the same or similar functionalities. Also similar to FIG. 1, task boxes 1 to 6 illustrate the order in which operations are performed according to one embodiment of the invention. As shown in FIG. 2, virtual center 150 manages VM configuration information of client 102, where the to-be-backed-up VM113 resides. A virtual center may manage VM configuration information of multiple clients, and each client contains one or more VMs managed by a VMM running therein. A virtual center may be communicatively coupled with clients, backup application server, and backup storage systems. VC 150 may obtain VM information through various ways. For example, VC 150 may remotely synchronize with VMMs within the network, or VMMs may update VC 150 whenever status change happens with VMs. In this example, virtual center 150 communicatively coupled with backup application server 105 and clients 101 and 102. Backup engine 106 sends out a request to backup with a VM identifier (indicating VM 113 in this example) to VC 150. VC 150 identifies that client 102 manages VMM 112, which hosts VM 113. Then at task box 2, VC 150 requests VMM 112 to establish a consistent state of VM 113. The following steps in task boxes 3-6 are similar to the task boxes 2-5 as illustrated in FIG. 1.

Figure 3:
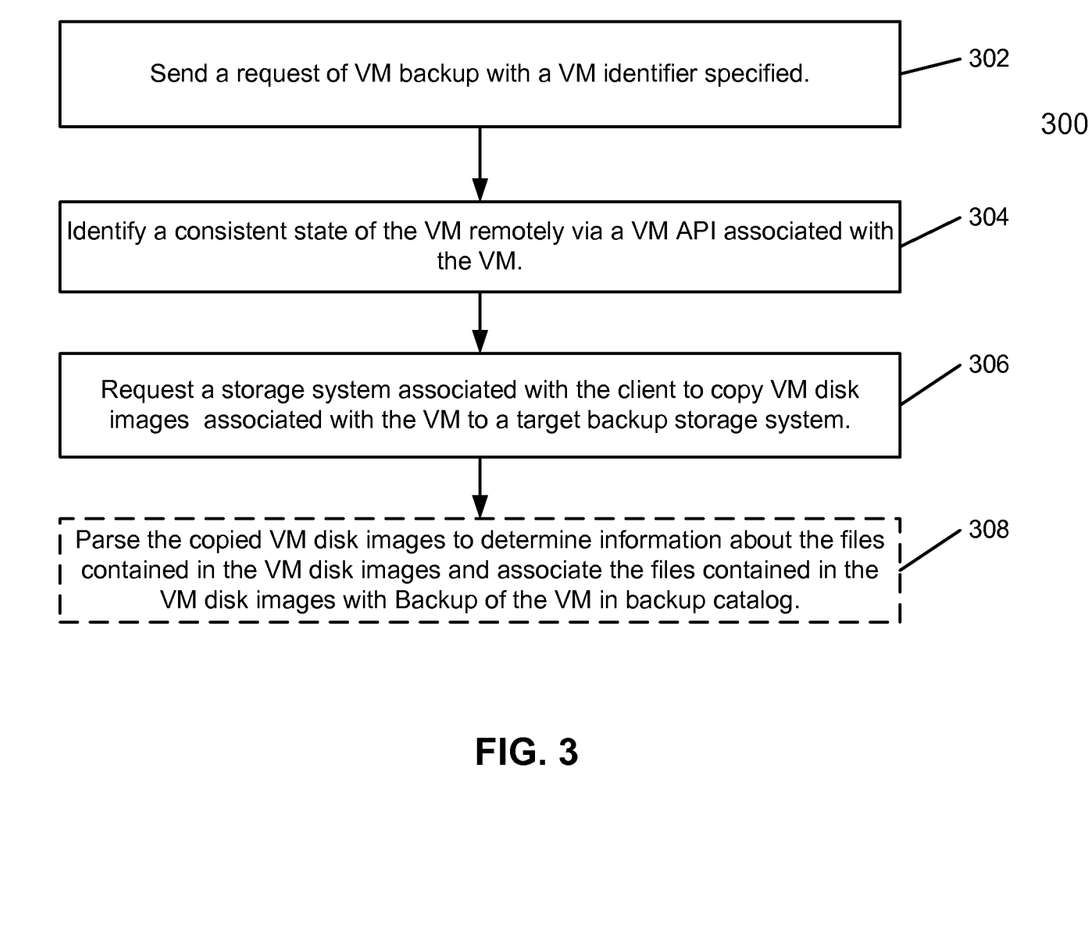
FIG. 3 is a flow diagram illustrating a method of backup according to one embodiment of the invention.

FIG. 3 is a flow diagram illustrating a method of backup according to one embodiment of the invention. Method 300 may be performed by backup application server 105, more specifically backup engine 106, which may be implemented as processing logic in software, hardware, or a combination thereof. At block 302, the method starts by a backup application server sending a request of VM backup with a requested VM identifier specified. The request may be sent to a VMM hosting the VM directly when the backup application server knows the VM location information in one embodiment. The request may be sent to a virtual center when the backup application server does not know VM location information in another embodiment. In the latter case, the virtual center then locates the VM and the VMM hosting the VM and requests a backup. The request to establish consistent state involves generating a VM snapshot at VMM in one embodiment. Then at block 304, backup engine 106 remotely identifies the consistent state of the VM via a VM API. Backup engine 106 then requests a storage system associated with the VM to copy VM disk images associated with the VM to a target backup storage system at block 306. In one embodiment, the requested VM disk images are disk snapshots based on a VM snapshot initiated by a VMM hosting the VM being backed up. Optionally, backup engine 106 may parse the copied VM disk images associated with the requested VM at block 308 to determine information about the files contained in the VM disk images. Based on the parsing, backup engine 106 associates the files contained in the VM disk images with backup of the VM in a backup catalog. The backup catalog then can be queried subsequently for backup and restore purposes. In addition, the VM disk images may further be deduplicated into deduplicated segments and stored in a storage unit of the backup storage system in a deduplicated manner. Note that in one embodiment, the backup VM disk images from the storage system may be copied to a proxy server first before they are stored in a backup storage system.

Figure 4:
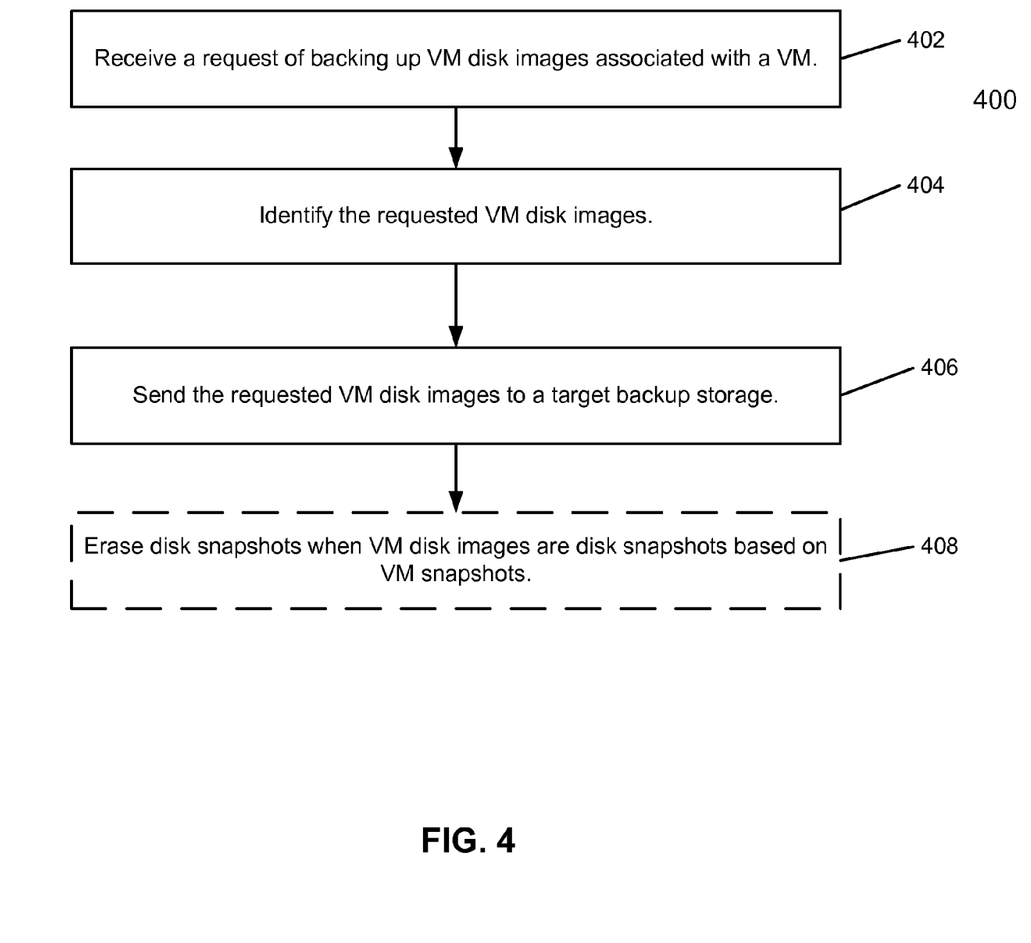
FIG. 4 is another flow diagram illustrating a method of backup according to one embodiment of the invention.

FIG. 4 is another flow diagram illustrating a method of backup according to one embodiment of the invention. Method 400 may be performed by storage system 180, more specifically backup logic 184. At block 402, the method starts with receiving a request for backing up VM disk images associated with a specified VM. In one embodiment, the requested VM disk images are disk snapshots based on a VM snapshot initiated by a VMM hosting the VM being backed up. Then at block 404, the requested VM disk images are identified. The identified disk snapshots are then sent to a target backup storage system at block 406. Note the identified VM disk images may be sent to a proxy server instead in some embodiment. After the disk snapshots are sent, optionally in one embodiment when the VM disk images are disk snapshots, the disk snapshots may be erased at block 408. The erasing of disk snapshots is triggered by a deleting VM snapshot initiated remotely by a backup application server via a VM API in one embodiment. Note when the target storage is a deduplicating backup storage, storage system 180 may divide the disk snapshots into segments and send over only the segments that do not already exist in the target storage, as described above. In one embodiment, the segments are variable sized and the segment boundaries are defined by the content of the data.

Figure 5:
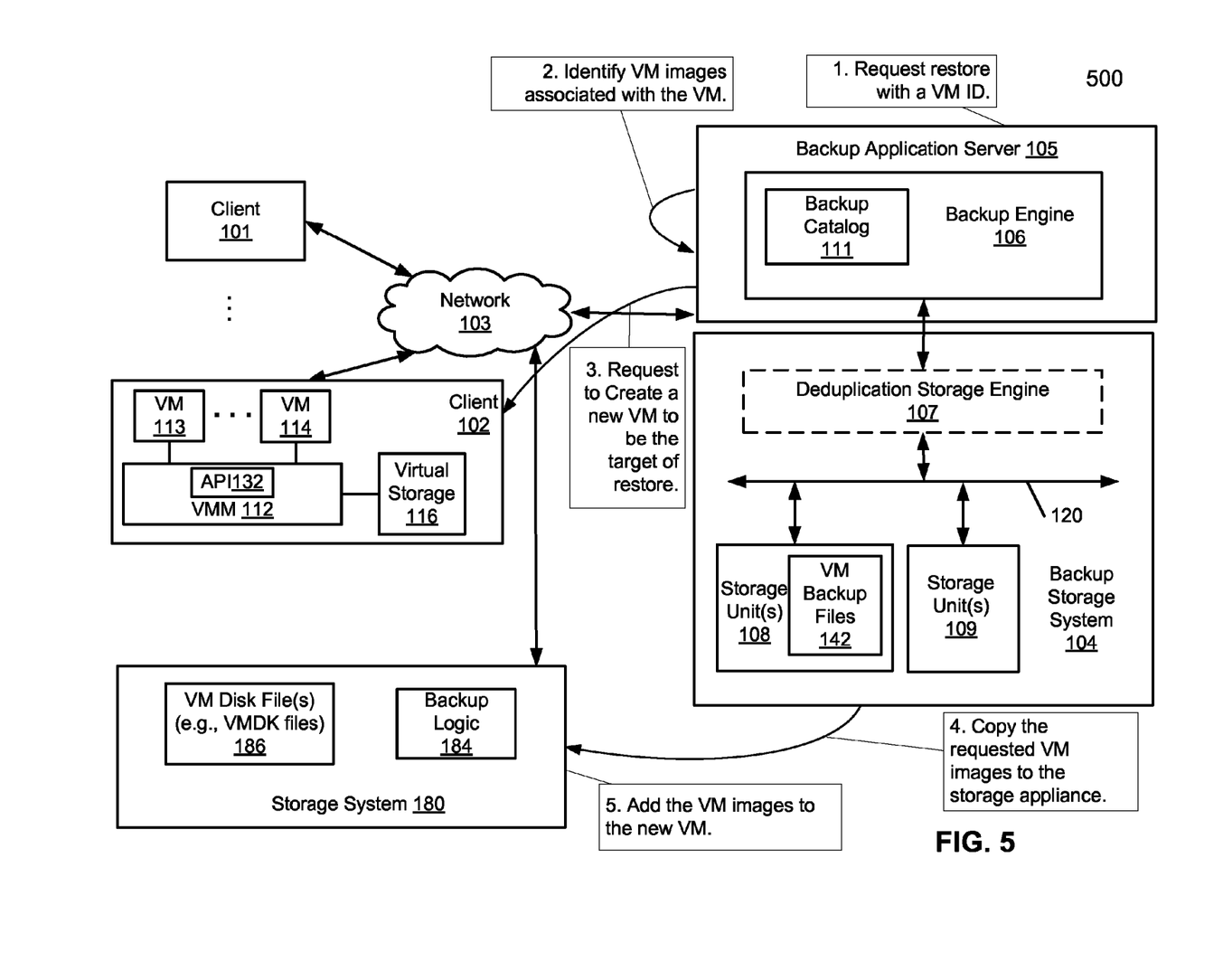
FIG. 5 is a block diagram illustrating a restoration process according to one embodiment of the invention.

FIG. 5 is a block diagram illustrating a restoration process according to one embodiment of the invention. The systems in FIG. 5 are similar to systems in FIG. 1 and the same or similar references indicate elements or components having the same or similar functionalities. Also similar to FIG. 1, task boxes 1 to 5 illustrate the order in which operations are performed according to one embodiment of the invention. In this example, VM 113 is requested to be restored at client 102. At task box 1, backup engine 106 receives a request to restore with a VM identification, which indicates the requested VM is VM 113. The request may come from a client based on a user request, or it may come from a user directly through a user interface. At task box 2, backup engine 106 identifies the VM disk images associated with the backup of the VM. In one embodiment, the VM disk images associated with the backup of the VM are disk snapshots. In one embodiment, it may get the information about VM disk images through backup catalog 111. Backup catalog 111 contains file name, access control information, and information about layout of the files within a particular VM disk image. Through backup catalog 111, backup engine 106 identifies the requested VM disk images, which is VM backup files 142 stored in storage unit 108 in this example. Then at task box 3, backup engine 106 requests VMM 112, where the restored VM 113 will be hosted, to create a new VM to be the target of restoration via API 132. In one embodiment, VM attributes stored in backup catalog 111 is sent over to VMM 112. VMM 112 then creates a VM and provisions the VM using the VM attributes sent over by backup engine 106. At task box 4, backup engine 106 requests backup storage system 104 to copy VM disk images associated with VM 113, which is stored as VM backup files 142 in backup storage system 104, to storage system 180. In storage system 180, the VM disk images will then associated with the new provisioned VM. Note in one embodiment, storage system 180 is a deduplicating storage system. In which case, backup storage system 104 divides the saved VM disk images (VM backup files 142 in the example) into segments and sends over only the segments that do not already exist in storage system 180. The final step in the process is task box 5, where the copied over VM disk images are then associated with the newly provisioned VM 113.

Figure 6:
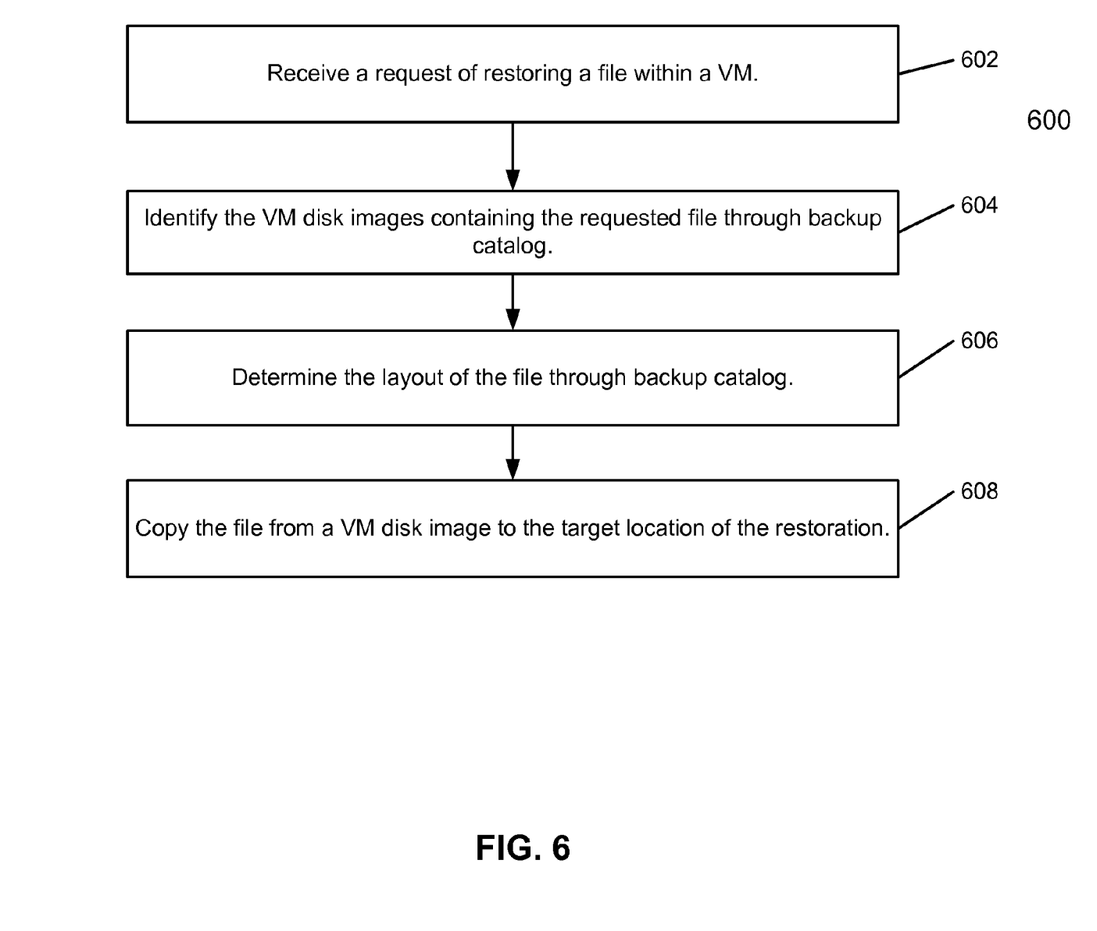
FIG. 6 is a flow diagram illustrating a method of restoration according to one embodiment of the invention.

Embodiments of the invention may also be used to restore a file within a backed up VM. FIG. 6 is a flow diagram illustrating a method of restoration according to one embodiment of the invention. Method 600 may be performed by backup application server 105, more specifically backup engine 106. At block 602, a request to restore a file within a VM is received at a backup application server, the backup application server is communicatively coupled with a backup storage system that contains backup of the file. The request may come from a client based on a user request, or it may come from a user directly through a user interface. A backup engine of the backup application server then identifies the VM disk images containing the requested file or deduplicated segments associated with the requested file through backup catalog. In one embodiment, the VM disk images are disk snapshots associated with the VM. The disk snapshots may be stored in the storage units of the backup storage system, for example storage unit 108 as a part of VM backup files 142 as shown in FIG. 5. The backup engine then determines the layout of the requested file through a backup catalog or other metadata such as fingerprints of the deduplicated segments at block 606. The identified file is then copied to a storage system associated with the requesting client at block 608. In one embodiment, based on the layout of the requested file, the file is reconstructed at the backup storage system and then sent over to the storage system. At the storage system, the file is then copied to the specified location and the VM requesting the restoration then will be able to access to the file. In a deduplicated storage system, the file may be reconstructed by deduplicated storage engine 107 from the deduplicated segments using the metadata such as fingerprints. Alternatively, the metadata may be transmitted to storage system 180 and the file is reconstructed by the storage system 180 based on the metadata. If storage system 180 is a deduplicated storage system, only the segments that do not exist in storage system 180 may be transmitted from backup storage system 104.

According to one embodiment, a storage system performs a comparison such as a "diff" operation of the identified VM disk images against the corresponding VM disk images associated with a previous snapshot of the VM to determine the changes since the last backup (e.g., the delta between the VM disk image and the last backup). In one embodiment, the VM disk image is a disk snapshot. In another embodiment, the storage system tracks the changes to a disk since the last disk snapshot was taken and determines the changes since the last backup by using this tracking information.

The changes since the last backup are copied to the backup storage system for backup. In one embodiment, the backup storage system creates a copy of the previous full backup in the backup storage system and applies the copied changes to the copy of the previous full backup to obtain a synthetic full backup. In another embodiment, the storage system sends the changes since last backup together with recipes to the backup storage system to enable the backup storage system to create a synthetic full backup based on contents of the previous full backup.

Figure 7:
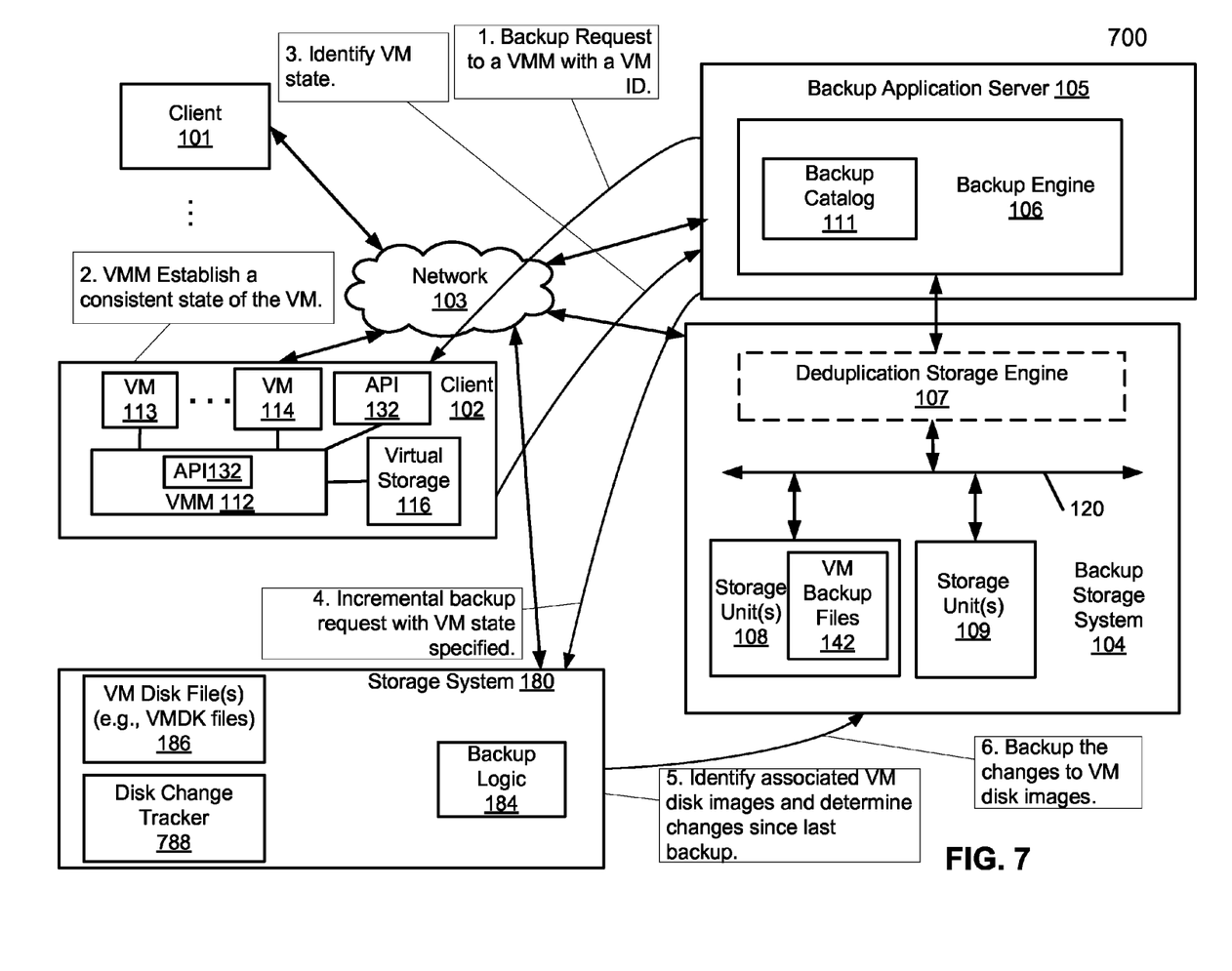
FIG. 7 is a block diagram illustrating an incremental VM backup process according to one embodiment of the invention.

FIG. 7 is a block diagram illustrating an incremental VM backup process according to one embodiment of the invention. The systems in FIG. 7 are similar to the systems in FIG. 1 and the same or similar references indicate elements having the same or similar functionalities. Also similar to FIG. 1, task boxes 1 to 6 illustrate the order in which operations are performed according to one embodiment of the invention. The process starts with a request of incremental backup of a VM at task box 1. The request may come from a client based on a user request, or it may come from a user directly through a user interface. At task box 1, backup engine 106 sends out a request for VM configuration information with a VM identifier (VM 113 in this example) to VMM 112, which hosts VM 113 at client 102. Note when backup application server 105 is unclear of the VM location, it may send the incremental VM backup request to virtual center 105, which manages client of a network, similarly as shown in FIG. 2. Then at task box 2, VMM establishes a consistent state of VM 113. The consistent state of VM 113 may be established by taking a VM snapshot through VM API 132. The VM snapshot may result in the creation of one or more disk snapshots in and/or by storage system 180. Onward to task box 3, backup application server 105 then identifies the VM consistent state via API 132. Backup application server 105 then sends a request for incremental backup to storage system 180 at task box 4 with consistent VM state information specified.

At task box 5, the VM disk images associated with the VM are identified. In one embodiment, the VM disk images are disk snapshots based on VM snapshot taken by VMM 112. Backup logic 184 identifies the VM disk images associated with the VM, and they are represented by VM disk files 186. VM disk files 186 may take a format of a virtual machine disk (VMDK) provided by VMware. For each identified VM disk image, disk change tracker 788 determines the changes since the last backup. In one embodiment, disk change tracker 788 performs a comparison such as a "diff" operation of the identified disk snapshot against the corresponding disk snapshot associated with a previous snapshot of the VM to determine the changes since the last backup. In another embodiment, disk change tracker 788 tracks the changes to a disk since the last disk snapshot was taken and determines the changes since the last backup by using this tracking information. At task box 6, the identified changes of VM disk images are backed up to backup storage system 104. After completion of the backup, optionally backup application server 105 sends a request to VMM 112 to delete the VM snapshot taken and causes storage system 180 to deletes the corresponding disk snapshot, when the VM disk images are disk snapshots based on VM snapshots in some embodiments. Note in one embodiment, VMM may keep track of disk changes within the associated storage system. In the example, VMM 112 may keep track of disk changes within storage system 180.

Figure 8:
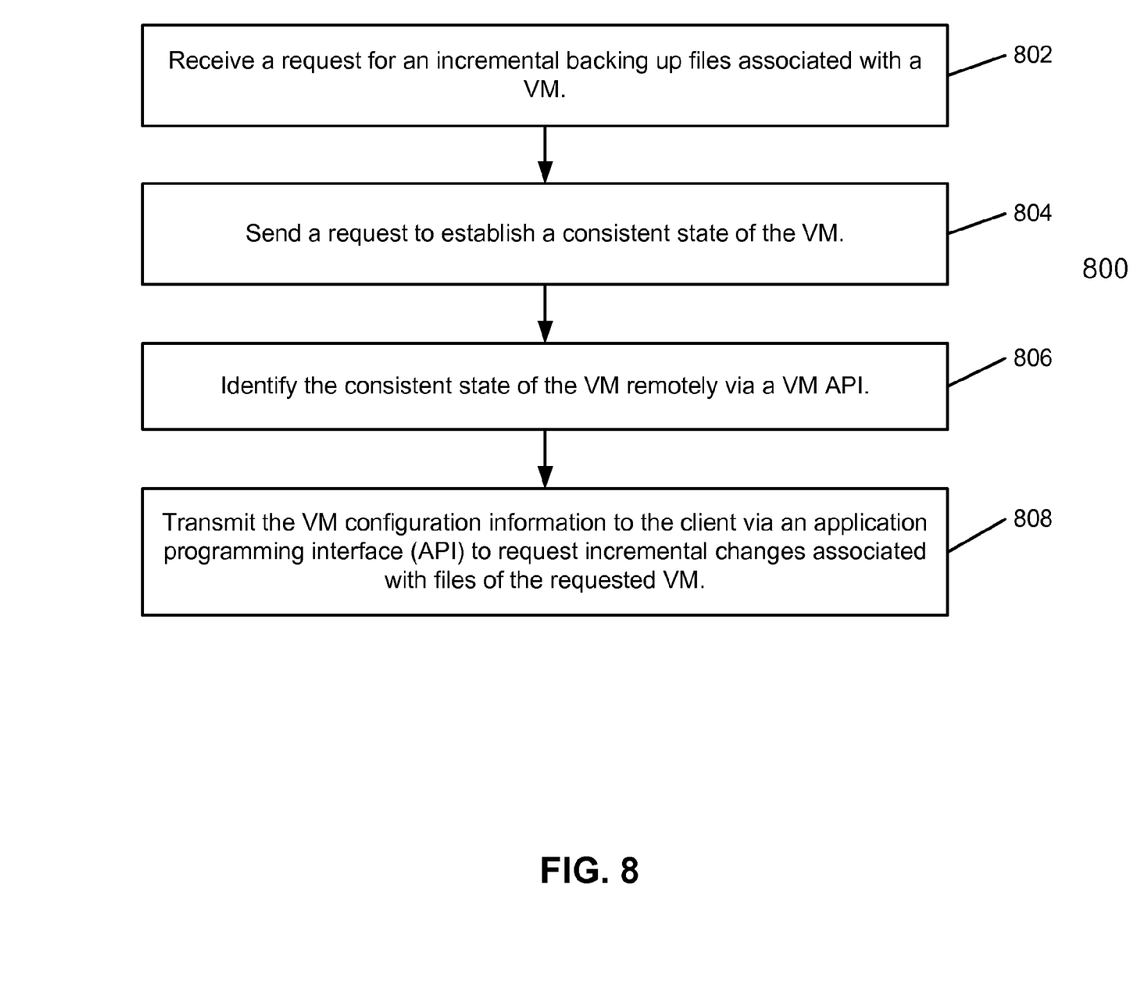
FIG. 8 is a flow diagram illustrating a method for incremental VM backup according to one embodiment of the invention.

FIG. 8 is a flow diagram illustrating a method for incremental VM backup according to one embodiment of the invention. Method 800 may be performed by backup engine 106 of FIG. 1, which may be implemented as processing logic in software, hardware, or a combination thereof. Referring to FIG. 8, at block 802, a backup engine of a backup application server receives a request for an incremental backup of a VM at a backup storage system. The backup engine then sends a request to establish a consistent state of the VM at block 804. In one embodiment, the request may be sent to a VMM hosting the VM directly. In another embodiment, the request may be sent to a virtual center managing the clients with a network, where the virtual center contains VM location information. The VM consistent state may be established by taking a VM snapshot by the hosting VMM. The VM snapshots may result in disk snapshots associated with the VM at a storage system associated with the client managing the VM. Once the VM consistent state is established, the backup application server may remotely identify the consistent state of the VM via a VM API at block 806. Then the backup engine requests the storage system to copy incremental VM disk images associated with the VM to a target backup storage system.

Figure 9:
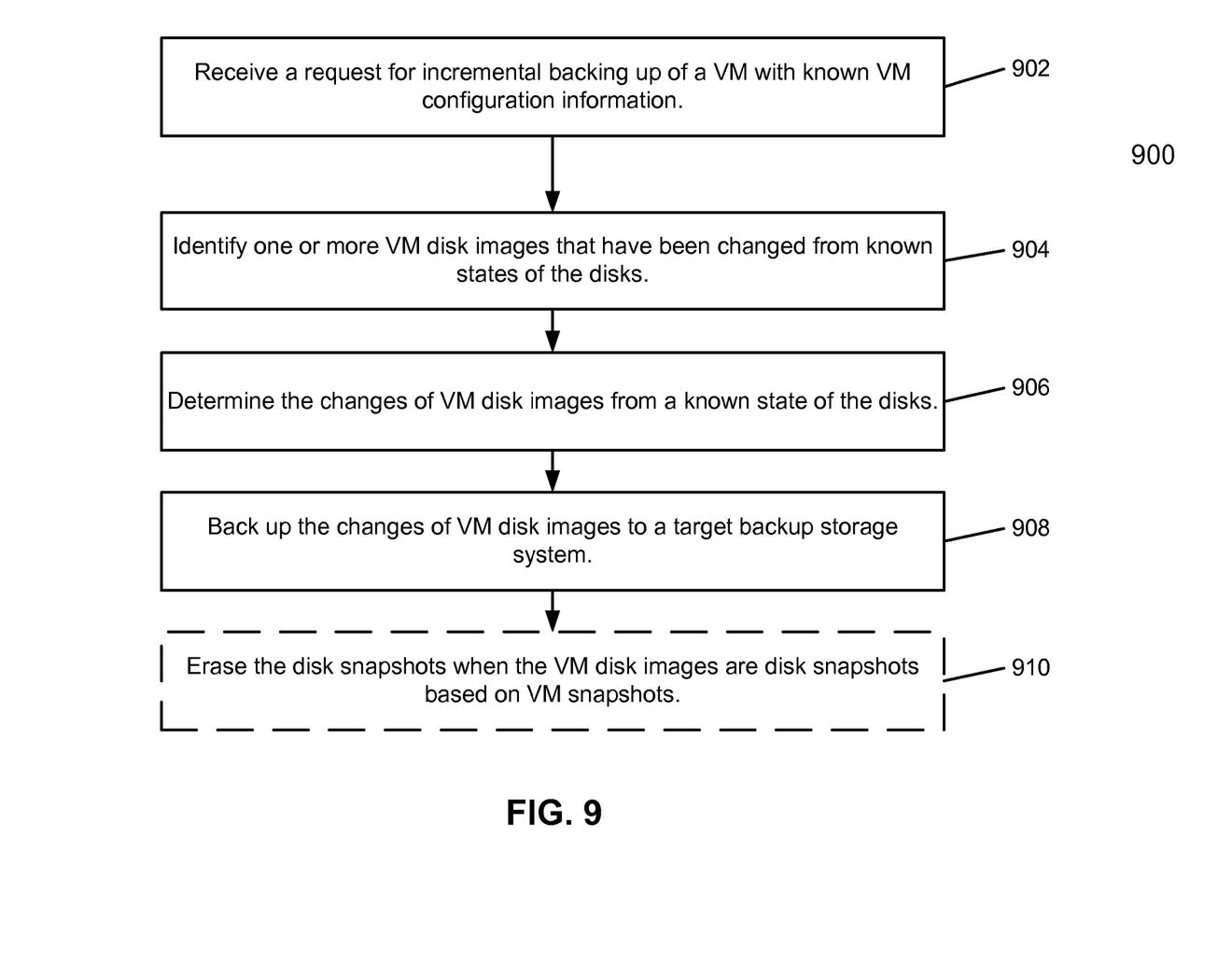
FIG. 9 is a flow diagram illustrating a method for incremental VM backup according to one embodiment of the invention.

FIG. 9 is a flow diagram illustrating a method for incremental VM backup according to one embodiment of the invention. Method 900 may be performed by storage system 108 of FIG. 7. At block 902, the method starts with receiving a request for incremental backing up a VM with a known consistent state information of the VM at a storage system. As shown in FIG. 7, the known consistent state information of the VM may be received from a backup application server like backup application server 105. In one embodiment, the known consistent state information of the VM is disk snapshots resulting from a VM snapshot. One or more VM disk images that have been changed from known states of the disks are identified at block 904. Subsequently the method determines the changes of VM disk images from a known state of the disks at block 906. In one embodiment, disk change tracker 788 may perform the operations of blocks 906 and 808. In another embodiment, disk change tracker 788 is integrated with backup logic 184, and backup logic 184 performs both operations. In one embodiment, the VM disk images are disk snapshots, and the changes of disk snapshots may be determined by a comparison such as "diff" operation of the identified disk snapshot against the corresponding disk snapshot associated with a previous snapshot of the VM. In another embodiment, the changes of disk snapshots are tracked by either disk change tracker 788 or backup logic 184. The changes of VM disk images are then backed up to a target backup storage system at block 908. Note even through in one embodiment of FIG. 7, disk change tracker 788 are illustrated as implemented within a storage system, disk change tracker may be implemented at a client, and it may be associated with a VMM managing VMs. VMM may keep track of disk changes of an associated storage system. After the changes of disk snapshots are backed up, optionally the backup storage system may remotely delete the VM snapshot taken via the VM API, and the deletion results in the disk snapshots being erased when the VM disk images are disk snapshots in one embodiment at block 910.

Figure 10:
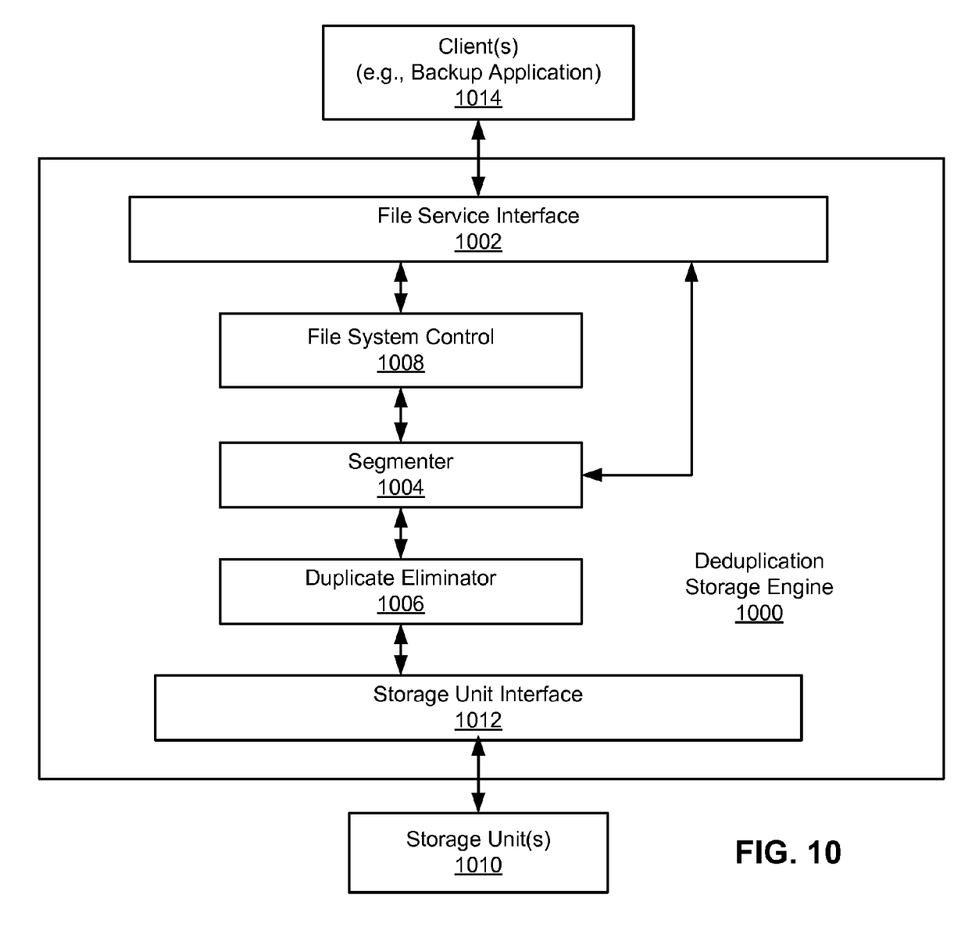
FIG. 10 is a block diagram illustrating a segment storage engine according to one embodiment of the invention.

FIG. 10 is a block diagram illustrating a segment storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1002 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to back up virtual machines, the method comprising:
   receiving a request at a first storage system for an incremental backup of a virtual machine (VM) from a backup application server over a network, the request including a VM identifier identifying the VM to be backed up from the first storage system to a second storage system, wherein the VM is hosted by a first host system communicatively coupled to the first storage system over a storage network, wherein the backup application server is a separate server configured to manage backups of a plurality of storage systems, including the first storage system and the second storage system;
   in response to the request, identifying by backup logic of the first storage system a first VM disk image file from a persistent storage device of the first storage system based on the VM identifier, wherein the first VM disk image file represents a first snapshot of the VM that was captured by the first host system;
   determining, by a disk change tracker of the first storage system, a difference between the first VM disk image file and a second VM disk image file representing a second snapshot of the VM, wherein the second VM disk image file has been previously backed up from the first storage system to the second storage system; and
   transmitting, by the backup logic of the first storage system, the difference between the first and second VM disk image files to the second storage system operating as a target backup storage system directly without going through the backup application server.

2. The method of claim 1, wherein the persistent storage device stores one or more disk snapshots created at the first storage system based on VM snapshots created by a virtual machine manager (VMM) of the first host system.

3. The method of claim 2, further comprising deleting one or more disk snapshots after the difference has been transmitted to the second storage system.

4. The method of claim 3, wherein deletion of the one or more disk snapshots is performed by erasing a VM snapshot initiated by the VMM.

5. The method of claim 2, wherein the difference between the first and second VM disk image files is determined based on disk change tracking by the first storage system.

6. The method of claim 1, wherein the second storage system reconstructs the first VM disk image file based on the transmitted difference and the second VM disk image file.

7. The method of claim 1, wherein the first storage system is a deduplicating storage system.

8. The method of claim 1, wherein the second storage system is a proxy server.

9. A non-transitory machine-readable medium having instructions stored therein, which when executed by a processor, cause the processor to perform operations to back up virtual machines, the operations comprising:
- receiving a request at a first storage system for an incremental backup of a virtual machine (VM) from a backup application server over a network, the request including a VM identifier identifying the VM to be backed up from the first storage system to a second storage system, wherein the VM is hosted by a first host system communicatively coupled to the first storage system over a storage network, wherein the backups application server is a separate server configured to manage backups of a plurality of storage systems, including the first storage system and the second storage system;
- in response to the request, identifying by backup logic of the first storage system a first VM disk image file from a persistent storage device of the first storage system based on the VM identifier, wherein the first VM disk image file represents a first snapshot of the VM that was captured by the first host system;
- determining, by a disk change tracker of the first storage system, a difference between the first VM disk image file and a second VM disk image file representing a second snapshot of the VM, wherein the second VM disk image file has been previously backed up from the first storage system to the second storage system; and
- transmitting, by the backup logic of the first storage system, the difference between the first and second VM disk image files to the second storage system operating as a target backup storage system directly without going through the backup application server.

10. The non-transitory machine-readable medium of claim 9, wherein the persistent storage device stores one or more disk snapshots created at the first storage system based on VM snapshots created by a virtual machine manager (VMM) of the first host system.

11. The non-transitory machine-readable medium of claim 10, wherein the operations further comprise deleting one or more disk snapshots after the difference has been transmitted to the second storage system.

12. The non-transitory machine-readable medium of claim 11, wherein deletion of the one or more disk snapshots is performed by erasing a VM snapshot initiated by the VMM.

13. The non-transitory machine-readable medium of claim 10, wherein the difference between the first and second VM disk image files is determined based on disk change tracking by the first storage system.

14. The non-transitory machine-readable medium of claim 9, wherein the second storage system reconstructs the first VM disk image file based on the transmitted difference and the second VM disk image file.

15. The non-transitory machine-readable medium of claim 9, wherein the first storage system is a deduplicating storage system.

16. The non-transitory machine-readable medium of claim 1, wherein the second storage system is a proxy server.

17. A storage system, comprising:
- a processor;
- a persistent storage device coupled to the processor;
- backup logic coupled to the persistent storage device and processor to
  - receive a request at the storage system operating as a first storage system for an incremental backup of a virtual machine (VM) from a backup application server over a network, the request including a VM identifier identifying the VM to be backed up to a second storage system, wherein the VM is hosted by a first host system communicatively coupled to the storage system over a storage network, wherein the backup application serer is a separate server configured to manage backups of a plurality of storage systems, including the first storage system and the second storage system,
  - in response to the request, identify a first VM disk image file from the persistent storage device based on the VM identifier, wherein the first VM disk image file represents a first snapshot of the VM that was captured by the first host system,
  - determine a difference between the first VM disk image file and a second VM disk image file representing a second snapshot of the VM, wherein the second VM disk image file has been previously backed up from the first storage system to the second storage system; and
  - transmit the difference between the first and second VM disk image files to the second storage system operating as a target backup storage system directly without going through the backup application server.

18. The system of claim 17, wherein the persistent storage device stores one or more disk snapshots created at the first storage system based on VM snapshots created by a virtual machine manager (VMM) of the first host system.

19. The system of claim 18, wherein the backup logic is to delete one or more disk snapshots after the difference has been transmitted to the second storage system.

20. The system of claim 19, wherein deletion of the one or more disk snapshots is performed by erasing a VM snapshot initiated by the VMM.

21. The system of claim 18, wherein the difference between the first and second VM disk image files is determined based on disk change tracking by the first storage system.

22. The system of claim 17, wherein the second storage system reconstructs the first VM disk image file based on the transmitted difference and the second VM disk image file.

23. The system of claim 17, wherein the first storage system is a deduplicating storage system.

24. The system of claim 17, wherein the second storage system is a proxy server.

* * * * *